June 4, 1957 R. BURZI 2,794,672
COLLAPSIBLE AND LET-DOWN TYPE VEHICLE TOP
Filed June 22, 1955 3 Sheets-Sheet 1

Inventor
Richard Burzi
By Scrivener + Parker,
Attorneys

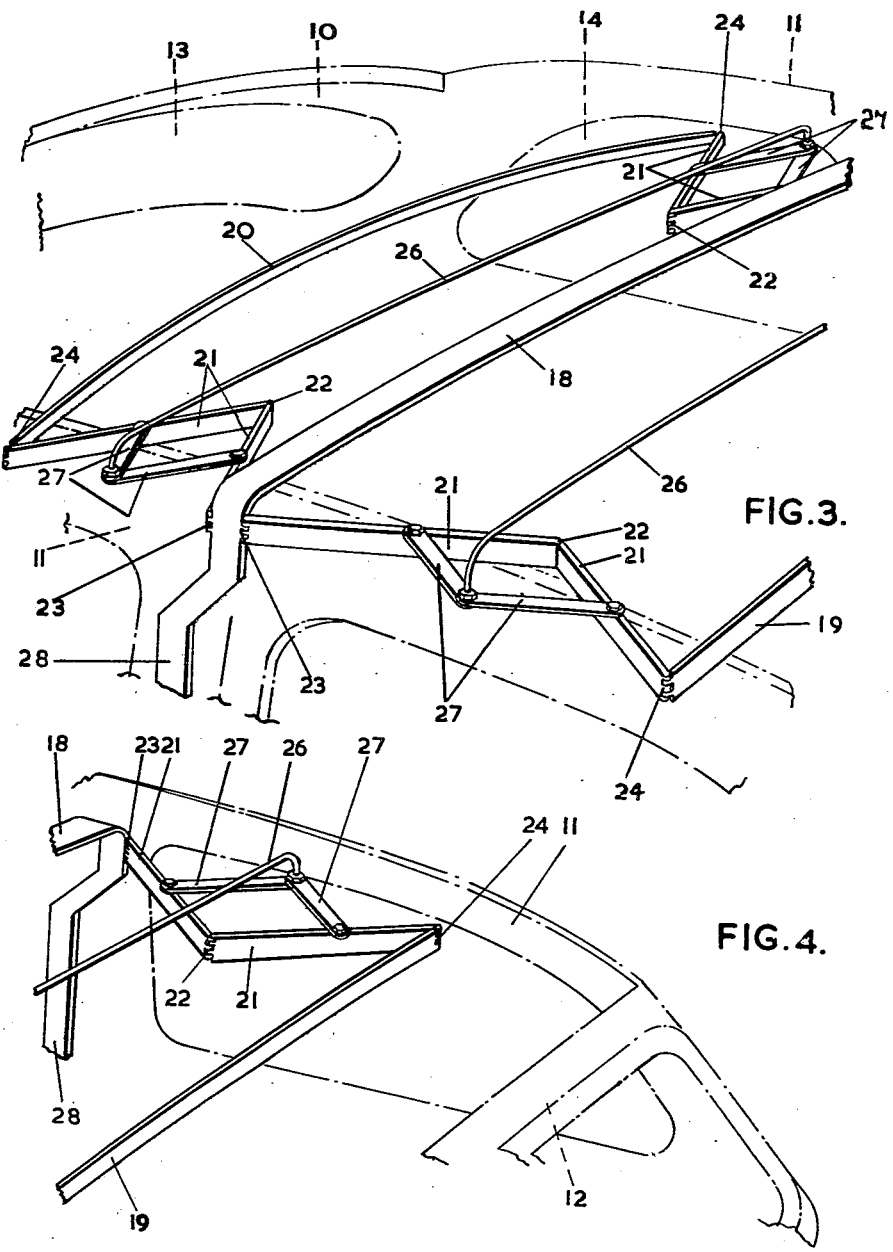

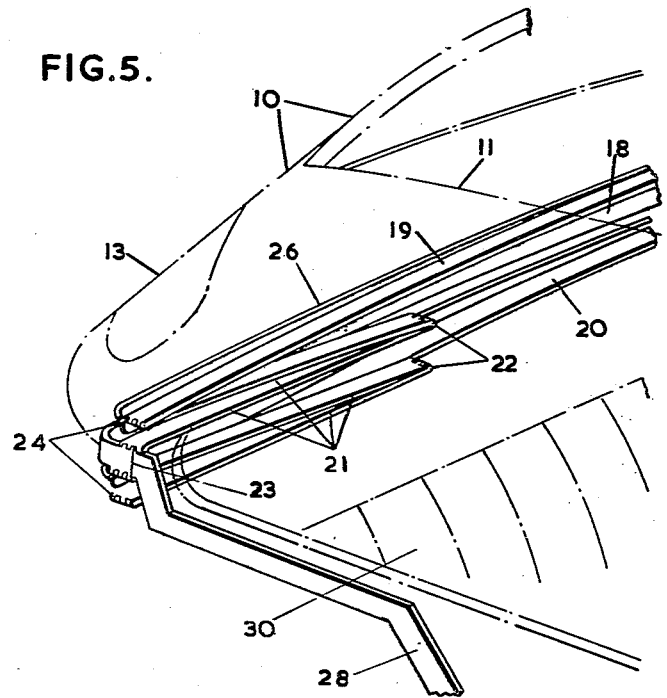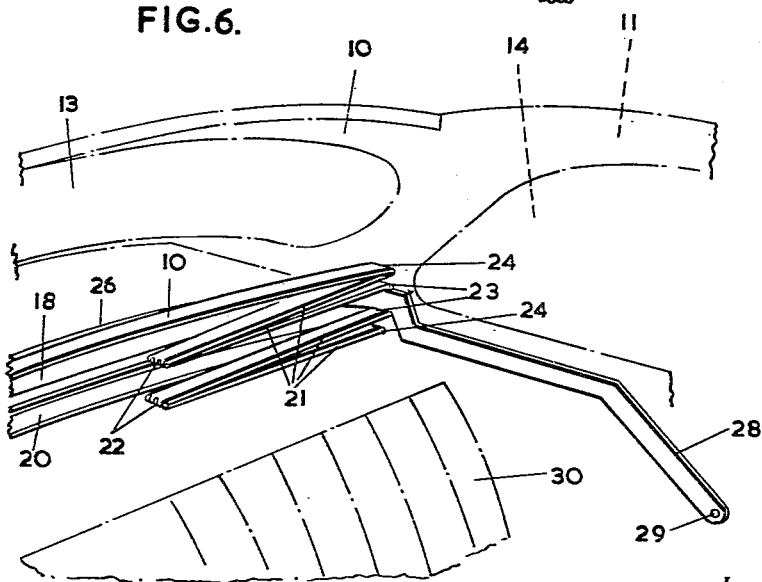

United States Patent Office 2,794,672
Patented June 4, 1957

2,794,672

COLLAPSIBLE AND LET-DOWN TYPE VEHICLE TOP

Richard Burzi, Northfield, Birmingham, England, assignor to The Austin Motor Company Limited, Northfield, England Application June 22, 1955, Serial No. 517,207

Claims priority, application Great Britain June 29, 1954

7 Claims. (Cl. 296—107)

This invention relates to automobiles of the convertible type, i. e. in which the body is provided with a collapsible fabric hood, which can be moved into a stowed position, so that an automobile can be converted from a closed into an open vehicle when desired.

In modern methods of manufacture of automobile bodies from large sheet metal stampings or pressings, the manufacture of a "convertible" body has hitherto presented problems quite distinct from the manufacture of saloon bodies. Thus a convertible body has hitherto had a collapsible hood affording the roof and upper rear wall of the passenger compartment, said upper rear wall usually having a small window of flexible material, and consequently a lack of lateral rigidity at the rear of the body has necessitated lateral bracing, so increasing production costs.

This disadvantage is not, of course, encountered with a saloon body, where the presence of a top panel affording a roof and upper wall gives inherent rigidity to the box-like structure as a whole.

According to the present invention, a body for an automobile of the convertible type is characterised in that its upper rear wall is a permanent fixed part of the body structure, that a top opening which is defined by the top edges of said upper rear wall, upper side walls and front windscreen framework is normally closed by a fabric hood carried by a collapsible frame, and in that said hood frame is pivotally mounted internally of the body in such a manner that, when fully collapsed, the said frame and hood can be swung down bodily past the forwardly presented face of the upper rear wall into a stowed position. Preferably the stowed position will be somewhat below the upper rear wall.

By reason of the convertible body having a permanent fixed upper rear wall which does not interfere with the collapsing and stowing of the hood assembly, the inherent rigidity of the body is not unduly impaired by the top opening, since the said permanent fixed upper rear wall constitutes a stiffening bridge.

The invention will now be described in greater detail with reference to the embodiment shown in the accompanying drawings; in which:

Figs. 3 and 4 are complementary top perspective views showing the hood frame in a partially collapsed condition.

Figs. 5 and 6 are complementary top perspective views showing the hood frame fully collapsed and in the stowed position.

In Figs. 3, 4, 5 and 6, the hood fabric has been omitted so as not to obscure the showing of the hood frame structure and its manner of folding.

Figure 1:
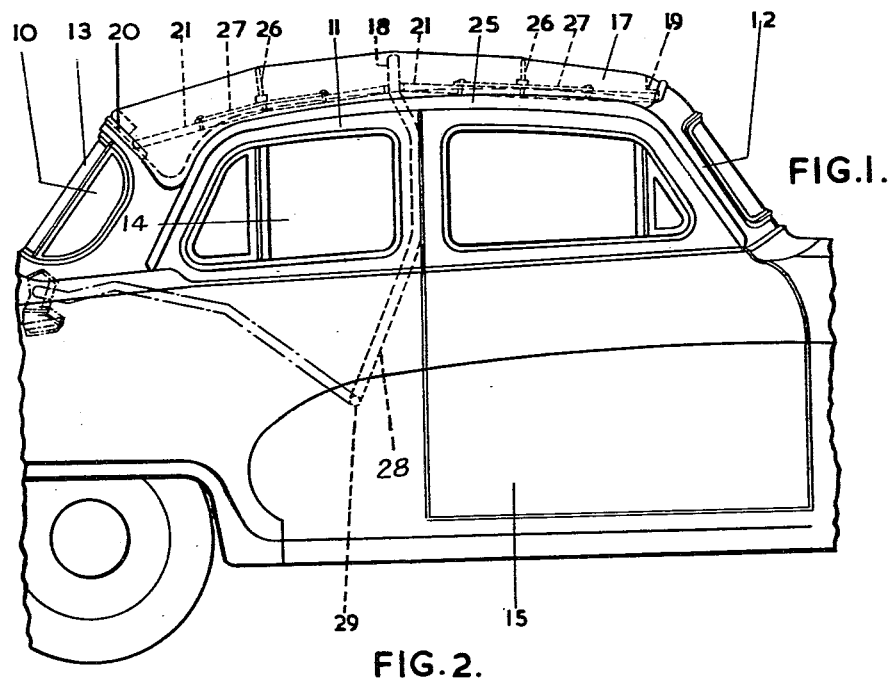
Fig. 1 is a fragmentary side elevation of an automobile of the two-door convertible type with its hood in the fully extended position.

Referring to the drawings, and more particularly to Fig. 1, the convertible body of the automobile has its upper part afforded by a permanent fixed upper rear wall 10, upper side walls 11 and a front windscreen framework 12, the rear wall 10 constituting the frame of the rear window 13 as is usual in saloon bodies and the side walls 11 being fitted with the usual rear side windows 14 and front doors 15. The upper edges of said walls 10, 11 and of the windscreen frame 12 jointly define a top opening, indicated by the reference 16 in Fig. 2, which top opening is normally closed, as shown in Fig. 1, by a fabric hood 17.

The fabric hood 17 is carried by a substantially horizontally disposed and rectangular framework structure which can be collapsed in its own plane and comprises a central transverse main strut 18, front and rear transverse main struts 19, 20 respectively, and folding side members 21 which connect the opposite ends of the central main strut 18 to the respectively corresponding ends of the struts 19, 20, the hood fabric 17 being secured to the transverse struts 18, 19, 20 only. Each folding side member 21, of which there are four, comprises two parts connected end-to-end by an elbow joint 22 to allow the said member to be folded laterally inwardly, the opposite extremities of each two-part folding side member 21 being hingedly connected one to an end of the central main strut 18, at 23, and the other to the corresponding end of either the front main strut 19 or the rear main strut 20, at 24. Thus the hood frame structure can be collapsed by moving the rear main strut 20 forwardly to a position as near as possible to the central main strut 18, and moving the front main strut 19 rearwardly to a similar position, a partially collapsed condition of the hood frame being clearly illustrated in Fig. 2 and also in Figs. 3 and 4.

The elbow-jointed two-part side members 21 are of such overall length that when the hood framework is fully extended so that the hood fabric 17 closes the roof or top opening 16, said side members 21 are pressed outwardly so as to bring the two parts of each member 21 into line or to a condition slightly beyond dead centre so as to retain the hood frame rigid with the said fabric 17 in tension. In this extended condition of the hood framework, the front and rear main struts 19, 20 seat upon the upper edges of the windscreen frame 12 and upper rear wall 10 respectively, and the side edges of the hood fabric 17 are engaged in recesses afforded by longitudinal channel strips 25 provided for the purpose of the upper edges of the upper side walls 11. The elbow-joints of the two-part side members 21 of the hood framework may each have an associated equalizing linkage (not shown) so as to ensure smooth and even folding of these two-part side members 21 when collapsing the hood assembly.

Figure 2:
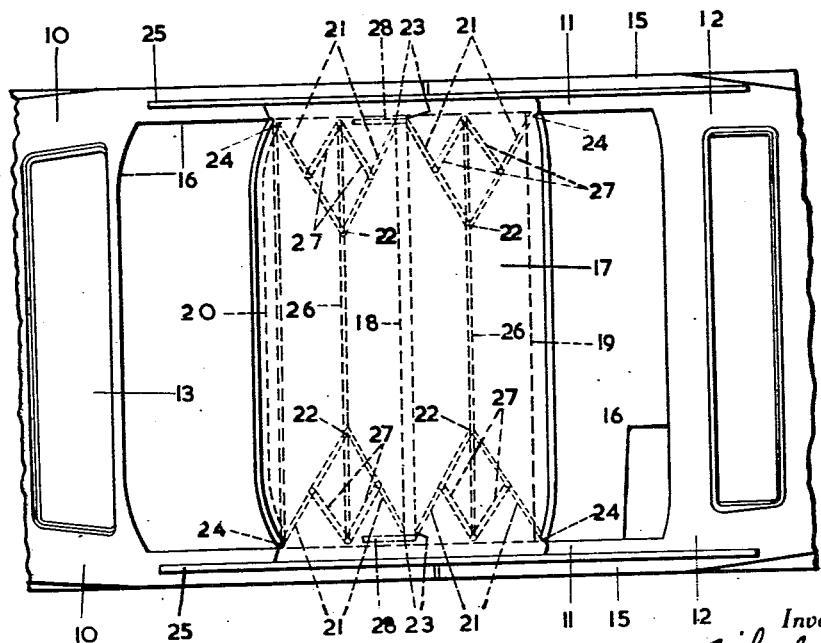
Fig. 2 is a plan view of Fig. 1, but showing the hood in a partially collapsed condition.

Preferably additional support is afforded for the hood fabric 17 between the main struts 18, 19 and 20, by auxiliary transverse struts 26, in the form of roof rods with bent down extremities, which auxiliary struts 26 are carried by pivoted links 27 connecting their extremities to the parts of the adjacent side members 21 (see particularly Figs. 2, 3 and 4).

The ends of the central transverse main strut 18 are rigidly connected to the upper ends of two similar radius arms 28 at opposite sides of the automobile body and having their lower ends pivoted at 29 to the internal side walls of said body so that said radius arms 28 can swing about a common horizontal transverse axis. The length of the radius arms 28 and the location of their pivotal mountings on the side of the body are such that the folding hood framework in fully collapsed condition can be swung down bodily with said arms 28 past the forwardly presented face of the upper rear wall 10 into a stowed position, as indicated in chain-dotted lines in Fig. 1 and clearly shown (minus the hood fabric 17) in Figs. 5 and 6, in which stowed position the collapsed hood assembly is somewhat below the upper rear wall 10 and behind the back 30 of the rear seat (see particularly Figs. 5 and 6). In the latter connection a stowage compartment (not shown) may be provided behind the top of the rear seat back 30 to accommodate the collapsed hood assembly. The radius arms 28 which carry the hood frame structure are so shaped or cranked that when in either of the two extreme positions they do not extend across the side windows 14; thus, as shown in Fig. 1 said radius arms 28 when in the erected or operative position have vertically disposed portions aligned with the door jambs at opposite sides of the body, whilst when said arms are in the stowed positions they extend below the level of the bottom of the rear side windows 14.

It will be appreciated that the convertible body as above described with a permanent upper rear wall which constitutes a stiffening bridge is tantamount to a saloon body with a top opening and therefore has none of the disadvantages of a conventional convertible body, and that the provision of a folding hood assembly which requires to be collapsed from the rear and from the front towards the centre and which is carried by radius arms of appropriate length with a suitably located pivotal axis, results in the advantage that the completely collapsed folding hood assembly can be swung down across the forwardly presented face of said permanent upper rear wall to a convenient stowed position within the body and to the rear of the back seat.

Having fully described my invention, what I claim and desire to secure by Letters Patent is:

1. An automobile body of the convertible type having in combination with the usual fixed windscreen frame and upper side walls an upper rear wall which is a permanent fixed part of the body structure and constitutes a stiffening bridge, the upper edges of said windscreen frame, upper side walls and upper rear wall defining a top opening, a flexible fabric hood which normally closes said top opening, a hood frame having a transverse center portion and being collapsible from both ends towards said transverse center portion, which carries said fabric hood, and pivotal mountings for said hood frame operatively connected to said transverse center portion and internally of the body such that said hood frame and fabric hood, when fully collapsed about said transverse center portion, can be swung down bodily past the forwardly presented face of the upper rear wall into a stowed position.

2. An automobile body of the convertible type having in combination with the usual fixed windscreen frame and upper side walls an upper rear wall which is a permanent fixed part of the body structure and constitutes a stiffening bridge, the upper edges of said windscreen frame, upper side walls and upper rear wall defining a top opening, a flexible fabric hood which normally closes said top opening, a hood frame, which carries said fabric hood, is normally disposed substantially horizontally and is collapsible in its own plane from both ends towards its transverse centre, radius arms pivotally mounted internally of the body about a common transverse axis and carrying said collapsible hood frame at its transverse centre, the disposition of said pivotal axis and the length of the said radius arms being such that, when fully collapsed, said hood frame and fabric hood can be swung about said axis from the normal in-use position bodily past the forwardly presented face of the upper rear wall into a stowed position and vice versa.

3. An automobile body of the convertible type having in combination with the usual fixed windscreen frame and upper side walls an upper rear wall which is a permanent fixed part of the body structure and constitutes a stiffening bridge, the upper edges of said windscreen frame, upper side walls and upper rear wall defining a top opening, a flexible fabric hood which normally closes said top opening, a hood frame which carries said fabric hood, is normally disposed substantially horizontally and is collapsible in its own plane from both ends towards its transverse centre, said hood frame being rectangular and comprising a central transverse main strut, front and rear transverse main struts and folding side members which connect opposite ends of said central main strut to the respectively corresponding ends of said front and rear main struts, radius arms rigidly connected at their upper ends to the opposite ends of said central transverse main strut and pivotally mounted at their lower ends and internally of the body about a common transverse axis, the disposition of said pivotal axis and the length of said radius arms being such that, when fully collapsed, said hood frame and fabric hood can be swung about said axis and bodily with said radius arms from the normal in-use position past the forwardly presented face of the upper rear wall into a stowed position and vice versa.

4. An automobile body of the convertible type having in combination with the usual fixed windscreen frame and upper side walls an upper rear wall which is a permanent fixed part of the body structure and constitutes a stiffening bridge, the upper edges of said windscreen frame, upper side walls and upper rear wall defining a top opening, a flexible fabric hood which normally closes said top opening, a hood frame which carries said fabric hood, is normally disposed substantially horizontally and is collapsible in its own plane from both ends towards its transverse centre, said hood frame being rectangular and comprising a central transverse main strut, front and rear transverse main struts and four folding side members each comprising two parts connected end-to-end by an elbow joint to allow laterally inward folding of said member, the opposite extremities of each two-part folding side member being hingedly conected one to an end of the central main strut and the other to the corresponding end of one of the other main struts, radius arms rigidly connected at their upper ends to the opposite ends of said central transverse main strut and pivotally mounted at their lower ends and internally of the body about a common transverse axis, the disposition of said pivotal axis and the length of said radius arms being such that, when fully collapsed, said hood frame and fabric hood can be swung about said axis and bodily with said radius arms from the normal in-use position past the forwardly presented face of the upper rear wall into a stowed position and vice versa.

5. An automobile body of the convertible type, as claimed in claim 4, in which the elbow-jointed two-part folding side members of the collapsible hood frame are of such overall length as to maintain the fully extended hood frame rigid, with the fabric hood in tension, when said side members are presssed outwardly so as to bring the two parts of each substantially into alignment.

6. An automobile body of the convertible type, as claimed in claim 4, including in the collapsible hood frame auxiliary transverse struts between the main struts, to afford additional support for the hood fabric, and pivoted links which carry said auxiliary struts and connect their extremities to the parts of the adjacent folding side members.

7. An automobile body of the convertible type, as claimed in claim 4, in which the stowed position for the fully collapsed hood frame and fabric hood is somewhat below the upper rear wall of the body and behind the back of rear seating in the body, and the radius arms are shaped so that when in either of their extreme positions they do not extend across windows in the upper side walls of the body.

References Cited in the file of this patent
UNITED STATES PATENTS

| | | |
|---|---|---|
| 2,348,579 | Solis | May 9, 1944 |
| 2,434,332 | Olivier | Jan. 13, 1948 |